United States Patent
Nishifukumoto (10) Patent No.: US 10,615,649 B2
(45) Date of Patent: Apr. 7, 2020

(54) INSTALLATION STRUCTURE OF MAGNET PLATE

(71) Applicant: FANUC CORPORATION, Yamanashi (JP)

(72) Inventor: Akira Nishifukumoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 68 days.

(21) Appl. No.: 15/993,680

(22) Filed: May 31, 2018

(65) Prior Publication Data

US 2018/0366995 A1    Dec. 20, 2018

(30) Foreign Application Priority Data

Jun. 19, 2017 (JP) .................................. 2017-119927

(51) Int. Cl.
    *H02K 1/08*     (2006.01)
    *H02K 1/18*     (2006.01)
    *H02K 41/03*     (2006.01)

(52) U.S. Cl.
    CPC ................ *H02K 1/08* (2013.01); *H02K 1/18* (2013.01); *H02K 41/031* (2013.01)

(58) Field of Classification Search
    CPC ........ H02K 1/08; H02K 41/031; H02K 41/02; H02K 41/03; H02K 41/0356; H02K 1/18
    USPC ......... 310/12.01, 12.02, 12.04, 12.05, 12.06, 310/12.24, 12.25, 12.18, 12.27
See application file for complete search history.

(56) References Cited

FOREIGN PATENT DOCUMENTS

| JP | H0587151 | * | 4/1993 |
|---|---|---|---|
| JP | H05087151 A | | 4/1993 |
| JP | 2001038508 A | | 2/2001 |
| JP | 2002192433 A | | 7/2002 |
| JP | 2006174583 A | | 6/2006 |
| JP | 2009072030 | * | 4/2009 |
| JP | 2009072030 A | | 4/2009 |
| JP | 2013-198278 A | | 9/2013 |

OTHER PUBLICATIONS

Notification of Reasons for Refusal issued by the Japanese Patent Office dated Jul. 30, 2019, which corresponds to Japanese Patent Application No. 2017-119927 and is related to U.S. Appl. No. 15/993,680.

* cited by examiner

*Primary Examiner* — Alfonso Perez Borroto
*Assistant Examiner* — Ahmed Elnakib
(74) *Attorney, Agent, or Firm* — Studebaker & Brackett PC (57) ABSTRACT

In an installation structure of a magnet plate for installing a magnet plate for a linear motor to a machine mounting part via a joining member, the magnet plate includes a first face, a second face, a first female threaded part at the second face, and an opening at the first face; the machine mounting part includes a second female threaded part having a winding direction opposite to the first female threaded part on a side opposing the magnet plate; the joining member includes a first male threaded part and a second male threaded part; and the magnet plate is installed to the machine mounting part with the first female threaded part being screwed with the first male threaded part, and with the second female threaded part of the machine mounting part being screwed with the second male threaded part.

4 Claims, 10 Drawing Sheets

INSTALLATION STRUCTURE OF MAGNET PLATE

This application is based on and claims the benefit of priority from Japanese Patent Application No. 2017-119927, filed on Jun. 19, 2017, the content of which is incorporated herein by reference.

BACKGROUND OF THE INVENTION

Field of the Invention

The present invention relates to an installation structure of a magnet plate in a linear motor.

Related Art

In recent years, the use of linear motors as the drive device of a variety of kinds of industrial machines such as the magnetic head drive mechanism of an OA machine, and spindle/table feed mechanism of a machine tool, have been proposed. In this type of linear motor, magnet plates made by arranging a plurality of plate-shaped permanent magnets in a planar form have been widely used as the field magnetic poles. In linear motors of the aforementioned applications, in order to prevent positional shift in an in-plane direction of the permanent magnets arranged in the magnet plate, technology for fixing the permanent magnets by pin-shaped restricting members has been proposed (for example, refer to Patent Document 1).

Patent Document 1: Japanese Unexamined Patent Application, Publication No. 2013-198278

SUMMARY OF THE INVENTION

In the aforementioned linear motors, if widening the width of the magnet plate (width in direction orthogonal to the movement direction of armature), the flexural rigidity in the width direction of the magnet plate lowers. In this case, even if positional shift in the plane direction of the permanent magnet is regulated, the magnet plate will deform to the armature side due to the attractive force of the magnetic field generated with the armature, and it becomes difficult to keep the spacing between the armature and magnet plate at the appropriate interval.

The object of the present invention is to provide an installation structure of magnet plates that can keep the spacing between the armature and magnet plate at the appropriate interval.

A first aspect of the present invention is an installation structure of a magnet plate for installing a magnet plate (for example, the magnet plate 10 described later) for a linear motor to a machine mounting part (for example, the machine mounting part 30 described later) via a joining member (for example, the joining bolt 40 described later), in which the magnet plate has a first face (for example, the first face F1 described later) on which a magnet is disposed and a second face (for example, the second face F2 described later) which opposes the machine mounting part; and includes a first female threaded part (for example, the first female threaded part 110 described later) provided on a side of the second face; and an opening (for example, the opening 120 described later) that is provided on a side of the first face, communicates with the first female threaded part, and into which a tool for rotating the joining member that fits together with the first female threaded part is inserted; the machine mounting part includes, at a side opposing the magnet plate, a second female threaded part (for example, the second female threaded part 310 described later) having a winding direction of thread grooves that is opposite to the first female threaded part; the joining member includes a first male threaded part (for example, the first male threaded part 41 described later) that is formed at one end thereof and can screw together with the first female threaded part, and a second male threaded part (for example, the second male threaded part 42 described later) that is formed at the other end thereof and can screw together with the second female threaded part; and the magnet plate is installed to the machine mounting part with the first female threaded part being screwed with the first male threaded part of the joining member, and with the second female threaded part of the machine mounting part being screwed with the second male threaded part of the joining member.

According to a second aspect of the present invention, in the installation structure of a magnet plate as described in the first aspect, an outer circumference of the opening may be positioned more inwards than an outer circumference of the first female threaded part provided to the magnet plate, when viewing the machine mounting part from the magnet plate.

According to a third aspect of the present invention, in the installation structure of a magnet plate as described in the second aspect, outer edges of the magnets which are adjacent and sandwiching the opening therebetween may be positioned more outwards than the outer circumference of the opening and more inwards than an outer circumference of the first female threaded part provided to the magnet plate, when viewing the machine mounting part from the magnet plate.

According to a fourth aspect of the present invention, in the installation structure of a magnet plate as described in any one of the first to third aspects, the first male threaded part may be a left-hand thread if the second male threaded part is a right-hand thread, and the first male threaded part may be a right-hand thread if the second male threaded part is a left-hand thread, in the joining member.

According to the present invention, it is possible to provide an installation structure of magnet plates that can keep the spacing between the armature and magnet plate at the appropriate interval.

DETAILED DESCRIPTION OF THE INVENTION

Hereinafter, an embodiment of the present invention will be explained. It should be noted that the drawings attached to the present disclosure are all schematic diagrams, and the shape of each part, scaling, length/width dimensional ratios, etc. are modified or exaggerated by considering the easy of understanding, etc. In addition, the drawings omit as appropriate the hatching indicative of cross-sections of members, etc.

In the present disclosure, etc., the terms specifying the shape, geometrical conditions, and extents thereof, for example, terms such as "parallel" and "direction", in addition to the strict meanings of these terms, include the scope of an extent considered to be substantially parallel, and a scope considered to be generally this direction. In the present disclosure, etc., the direction corresponding to the movement direction of an armature 20 in the linear motor 1 is defined as X (X1-X2) direction, the direction corresponding to the width (short end) direction of the linear motor 1 is defined as Y (Y1-Y2) direction, and the direction corresponding to the thickness direction is defined as Z (Z1-Z2) direction. In addition, it is similarly defined also for a machine mounting part 30 to which the linear motor 1 is installed.

Figure 1:
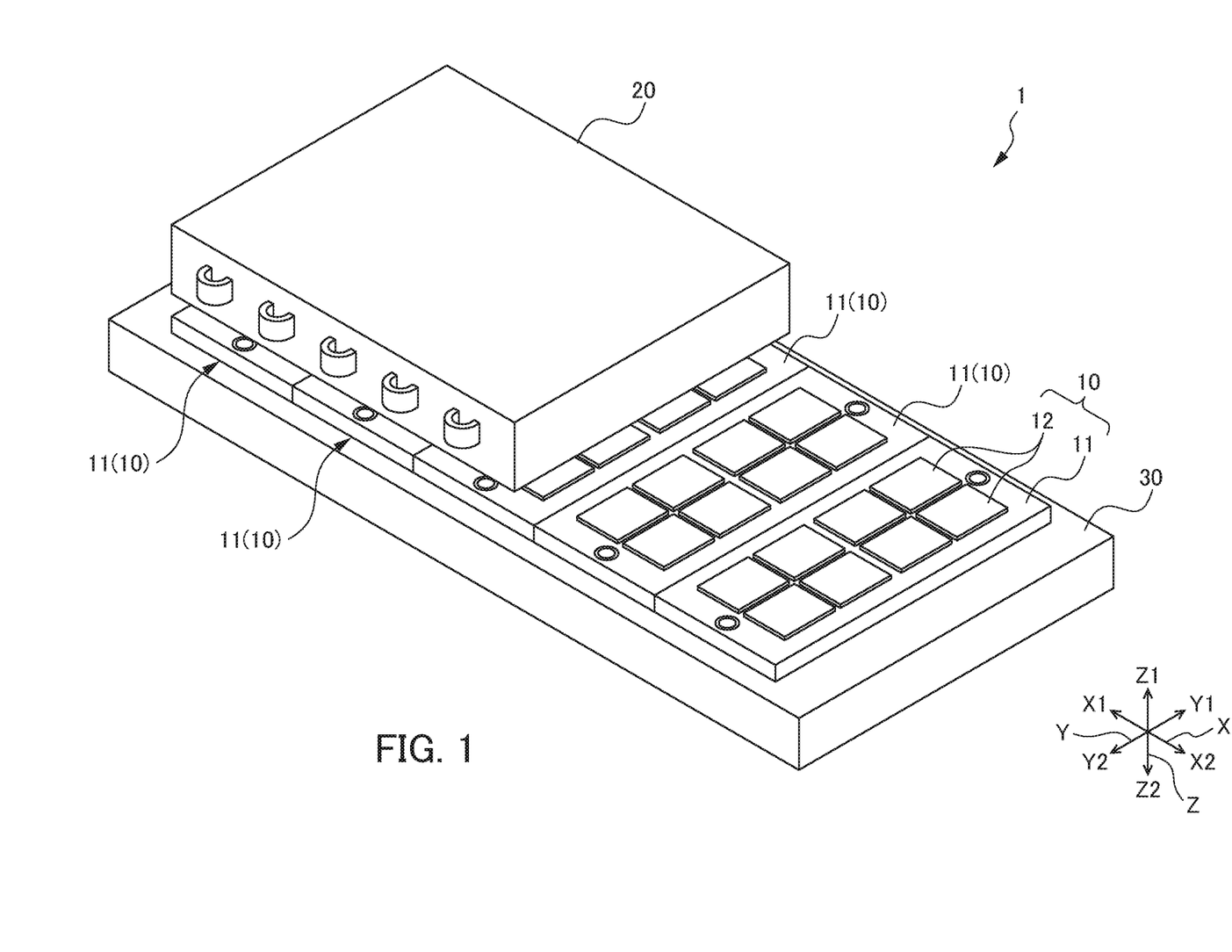
FIG. 1 is a perspective view showing an outline of a linear motor 1 of a first embodiment.
Figure 2:
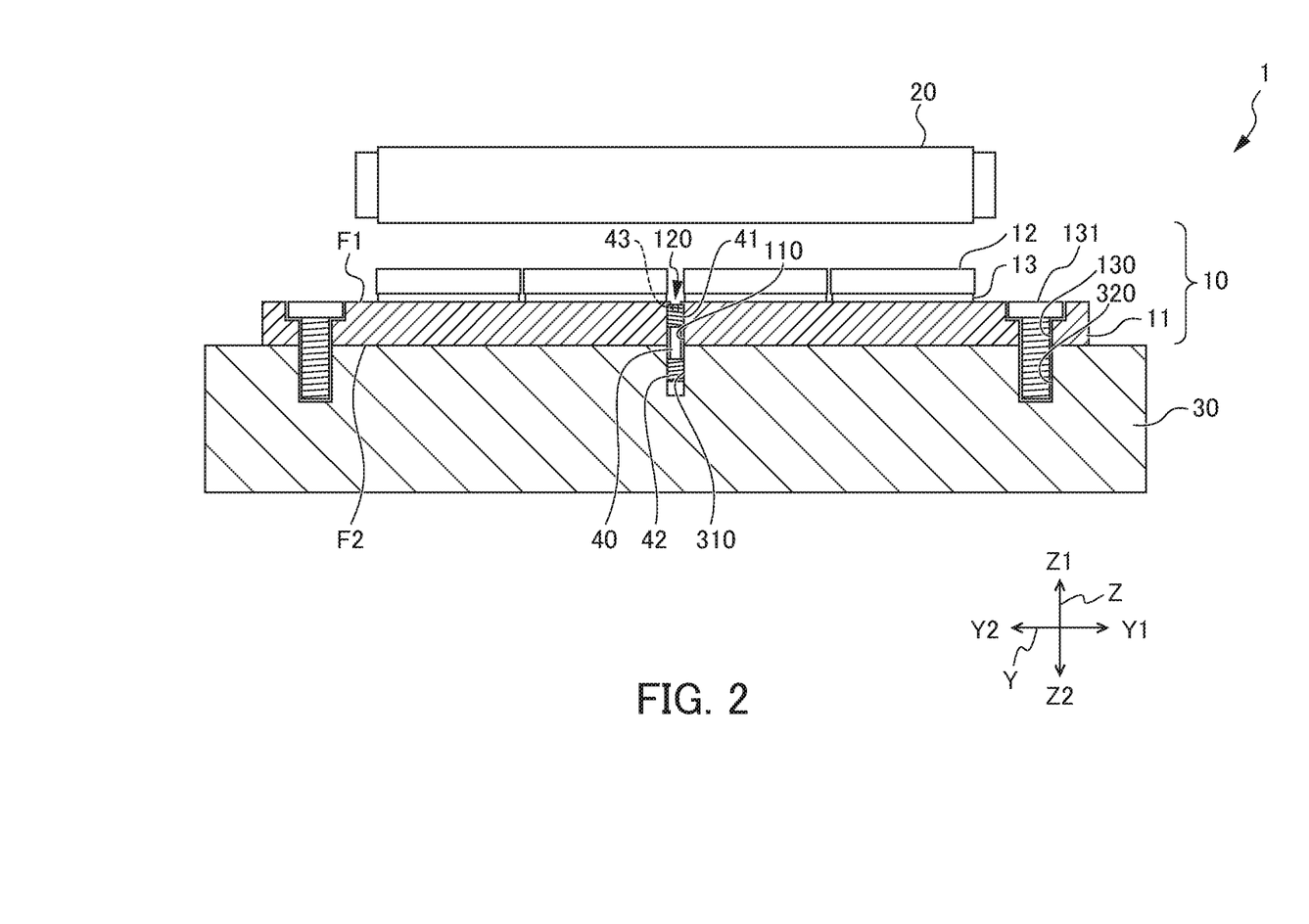
FIG. 2 is a cross-sectional view of the linear motor 1.
Figure 3A:
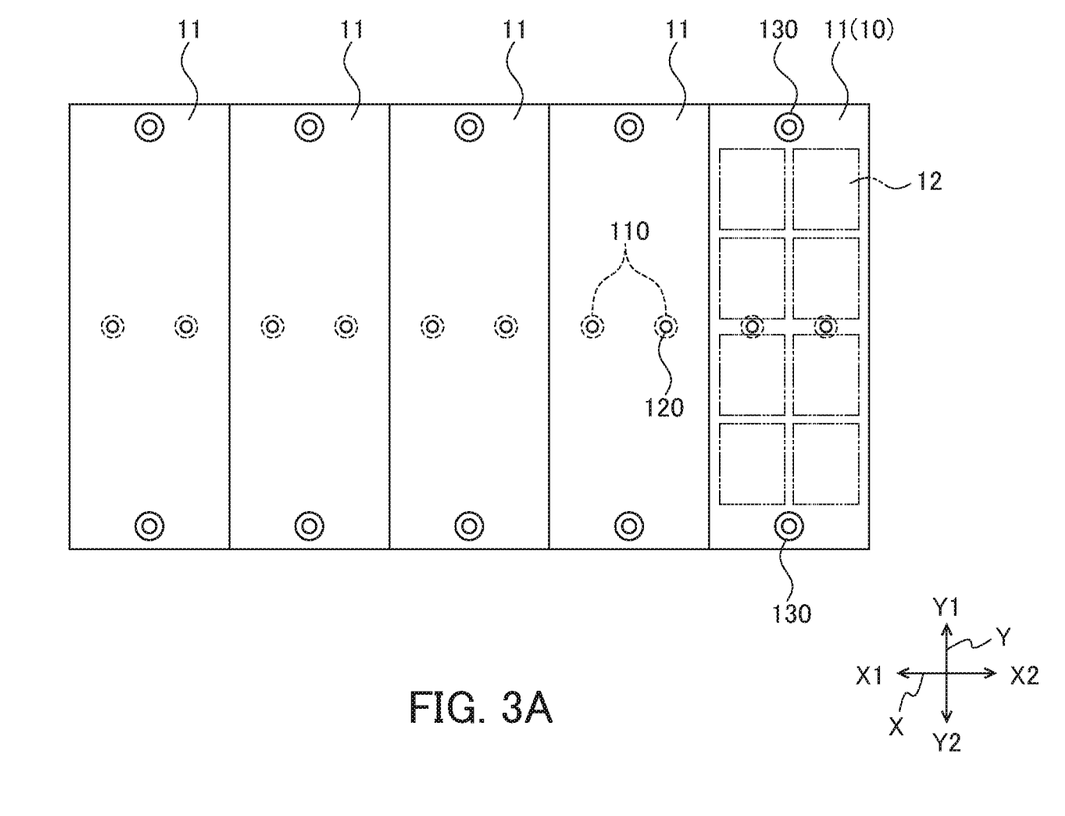
FIG. 3A is a plan view showing an arrangement of plates 11.
Figure 3B:
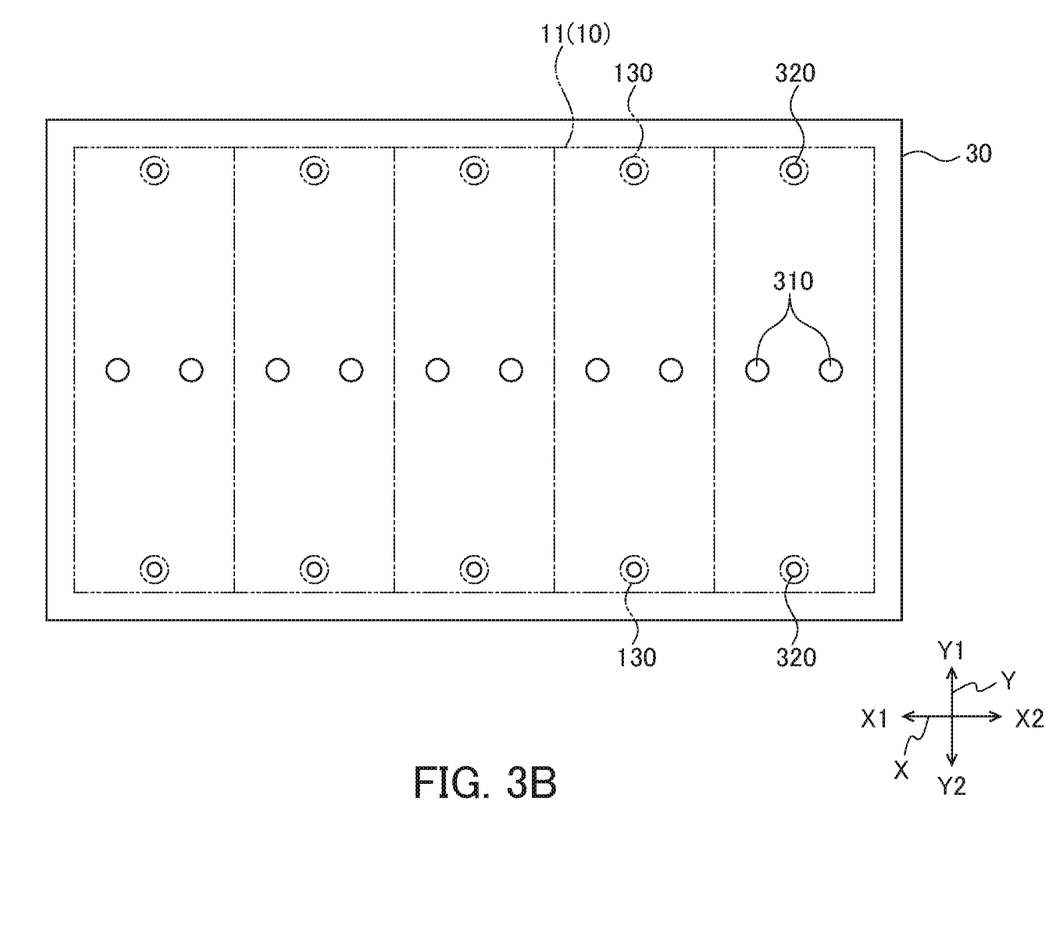
FIG. 3B is a plan view showing an arrangement of a second female threaded part 310 of a machine mounting part 30.

FIG. 1 is a perspective view showing an outline of the linear motor 1 of the present embodiment. FIG. 2 is a cross-sectional view of the linear motor 1. FIG. 2 shows a cross section in a plane parallel to the Y-Z plane of the linear motor 1. It should be noted that FIG. 2 shows the external appearance rather than the cross section of a bolt, and omits male thread grooves, female thread grooves, etc. FIG. 3A is a plan view showing an arrangement of plates 11. FIG. 3A shows a state arranging five of the plates 11 along the X direction. FIG. 3A shows the contours of the permanent magnets 12 arranged on each plate 11 by an imaginary line, with the plate 11 most to the X2 side as an example. FIG. 3B is a plan view showing the arrangement of second female threaded parts 310 of a machine mounting part 30. FIG. 3B shows the contour of the plates 11 (magnet plates 10) to be installed by an imaginary line.

As shown in FIG. 1, the linear motor 1 of the present embodiment includes a plurality of magnet plates (magnet plate for linear motor) 10, and the armature 20. The magnet plates 10 are field magnetic poles in which permanent magnets 12 (described later) of different polarity are alternately arranged along the movement direction (X direction) of the armature 20. The magnet plate 10 generates driving force for causing the armature 20 to move linearly in cooperation with the armature 20. As shown in FIG. 2, the magnet plate 10 includes the plate 11, permanent magnet 12, and joining layer 13.

The plate 11 is a plate-like metallic member. The plate 11 has a first face F1 serving as a surface on a Z1 side, and a second face F2 serving as a surface on a Z2 side, as shown in FIG. 2. The first face F1 is a surface on a side on which a plurality of the permanent magnets 12 is arranged. The second face F2 is a surface on a side fixed to the machine mounting part 30 (described later). The plate 11, for example, is formed by a laminated body of silicon steel plate, carbon steel, general structural rolled steel, or the like.

In the linear motor 1 of the present embodiment, five of the plates 11 (magnet plate 10) are arranged along the movement direction (X direction) of the armature 20, as shown in FIG. 1. Eight of the permanent magnets 12 are arranged on the first face F1 of each plate 11, respectively. It should be noted that the magnet plates 10 may be arranged in a state slightly skewed (slanted) relative to the movement direction of the armature 20. In addition, the number, shape, etc. of magnet plates 10 are not limited to the examples of the present embodiment, and are set as appropriate according to the specifications, etc. of the linear motor 1.

Figure 6:
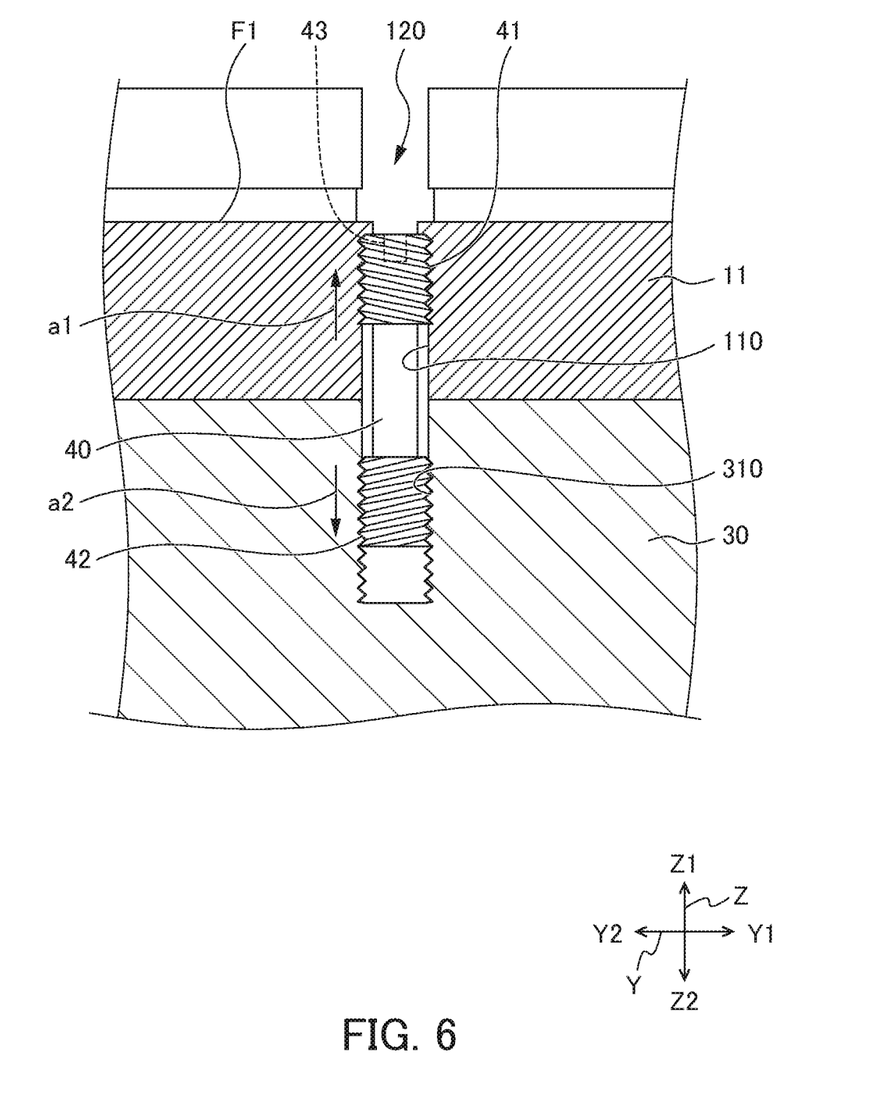
FIG. 6 is a partially enlarged view of a joining bolt 40 shown in FIG. 2 and a peripheral portion thereof.

The plate 11 includes the first female threaded part 110 on the side of the second face F2, as shown in FIG. 2. The first female threaded part 110 is provided at the central part in the Y direction of the plate 11 and at two locations along the X direction, as shown in FIG. 3A. The first female threaded part 110 is a portion in which a female thread groove is formed that can screw together with the first male threaded part 41 of a joining bolt 40 (described later). It should be noted that, in the first female threaded part 110 of the present embodiment, the female thread grooves are provided in a region on the first face F1 side of the plate 11, and not provided in a region on the second face F2 side, as shown in FIG. 6 described later; however, it is not limited thereto, and may be provided in the entire region.

Female thread grooves of left-hand thread are formed in the first female threaded part 110 of the plate 11. In addition, as described later, male thread grooves of left-hand thread which can screw together with the first female threaded part 110 are formed in the first male threaded part 41 of the joining bolt 40. For this reason, in a state screwing the first male threaded part 41 of the joining bolt 40 to the first female threaded part 110 of the plate 11, when rotating the joining bolt 40 clockwise from the Y1 side by a tool (not illustrated), the first male threaded part 41 of the joining bolt 40 is tightened to the first face F1 side (Z1 side) of the plate 11.

The plate 11 includes an opening 120 at a position overlapping the first female threaded part 110 (position at which centers overlap), in the X-Y plane as shown in FIG. 3A. The opening 120 is a hole provided on the first face F1 side of the plate 11, which is a hole for inserting a tool (hexagonal wrench in present example) for rotating the joining bolt 40. The opening 120 communicates with the first female threaded part 110 in a direction (Z direction) orthogonal to the X-Y plane. As described later, the opening 120 is formed so as to be a smaller diameter than the diameter of the first female threaded part 110 provided in the plate 11.

In addition, the plate 11 includes stepped holes 130 at ends in the Y1 and Y2 direction, as shown in FIG. 3A. The stepped hole 130 is a hole into which the bolt 131 (described later) is inserted upon fixing the plate 11 to the machine mounting part 30.

The joining bolt (joining member) 40 is a member for installing the plate 11 to the machine mounting part 30 (described later). In the joining bolt 40, a first male threaded part 41 is provided at one end in the longitudinal direction, and a second male threaded part 42 is provided to the other end, as shown in FIG. 2. The first male threaded part 41 is a threaded part which can screw into the first female threaded part 110 of the plate 11. The second male threaded part 42 is a threaded part that can screw into the second female threaded part 310 (described later) of the machine mounting part 30. In addition, a hexagonal hole 43 is provided in the head part on the first male threaded part 41 side of the joining bolt 40. The hexagonal hole 43 is a portion into which the hexagonal wrench (refer to FIG. 5B) fits as a tool. The operator can rotate the joining bolt 40 clockwise or counter-clockwise from the Y1 side, by fitting the hexagonal wrench together with the hexagonal hole 43 via the opening 120 provided in the plate 11.

Male thread grooves of left-hand thread are formed in the first male threaded part 41 at one end of the joining bolt 40. In addition, male thread grooves of right-hand thread are formed in the second male threaded part 42 at the other end of the joining bolt 40. In this way, thread grooves (male threaded part) in which the winding direction of the thread grooves are opposite are respectively formed at both ends in the longitudinal direction of the joining bolt 40.

The permanent magnet 12 is a member that generates a magnetic field, and is arranged via the joining layer 13 on the first face F1 of the plate 11, as shown in FIG. 2. For the permanent magnets 12, N-pole permanent magnets 12 and S-pole permanent magnets 12 are alternately arranged along the movement direction (X direction) of the armature 20, on the first face F1 of the plate 11. The joining layer 13 is a layer joining the plate 11 and permanent magnet 12, and is formed by adhesive, for example. The interval of adjacent permanent magnets 12 in the width direction (Y direction) of the magnet plate 10 will be described later.

In the present embodiment, eight of the permanent magnets 12 are arranged in a pattern of 4 (Y direction)×2 (X direction), on one plate 11, as shown in FIG. 1 and FIG. 3A. It should be noted that the number, arrangement form, etc. of the permanent magnets 12 arranged on the plate 11 are not limited to the examples of the present embodiment, and are set as appropriate according to the specifications, etc. of the linear motor 1.

The machine mounting part 30, for example, is a location at which the linear motor 1 is installed, as a drive device such as of the magnetic head drive mechanism of an OA machine, and spindle/table feed mechanism of a machine tool. In the present embodiment, although the machine mounting part 30 is illustrated as a plate-shaped member, in reality, it has a shape depending on the machine to be installed.

The machine mounting part 30 includes a second female threaded part 310 at a position opposing the first female threaded part 110 (refer to FIG. 3A) of the plate 11, as shown in FIG. 3B. The second female threaded part 310 is a portion in which female thread grooves which can screw together with the second male threaded part 42 of the joining bolt 40 (described later) are formed. It should be noted that, in the second female threaded part 310 of the present embodiment, the female thread grooves are provide in a region on a Z2 side of the machine mounting part 30, and not provided in a region on a Z1 side as shown in FIG. 6 described later; however, it is not limited thereto, and may be provided in the entire region.

Female thread grooves of right-hand thread are formed in the second female threaded part 310 of the present embodiment. In addition, male thread grooves of right-hand thread which can screw together with the second female threaded part 310 are formed in the second male threaded part 42 of aforementioned joining bolt 40. For this reason, in a state screwing the second male threaded part 42 of the joining bolt 40 together with the second female threaded part 310 of the machine mounting part 30, when rotating the joining bolt 40 clockwise from the Y1 side by way of a tool (not illustrated), the second male threaded part 42 of the joining bolt 40 is tightened to the machine mounting part 30 side (Z2 side).

In the machine mounting part 30, a bolt hole 320 is provide at a position opposing the stepped hole 130 of the plate 11 (position at which centers overlap) as shown in FIG. 3B. The bolt hole 320 has, in an inner circumferential surface, female threads which can screw together with the male threads of the bolt 131 inserted into the stepped hole 130 of the plate 11 (magnet plate 10).

The armature 20 generates driving force for causing the armature 20 to move linearly in cooperation with the magnet plate 10. The armature 20 includes an iron core, winding, etc. (not illustrated). The iron core is a member serving as a main body of the armature 20, for example, and is configured as a structure made by stacking a plurality of plates consisting of magnetic material. The winding is wire which is coiled in slots in the iron core. Alternating current electric power is supplied from an external power supply device. FIG. 1 omits illustration of cables, etc. supplying electric power to the winding of the armature 20.

When applying single-phase alternating current or three-phase alternating current as electric power to the winding of the armature 20, attractive force and repulsive force act between the shifting magnetic field produced by the winding and the magnetic field of the magnet plate 10, and thrust is imparted on the armature 20 by a component thereof in the movement direction (X direction). The armature 20 linearly moves along the X direction in which the permanent magnets 12 of the magnet plate 10 are arranged, as shown in FIG. 1, by way of this thrust.

Figure 4:
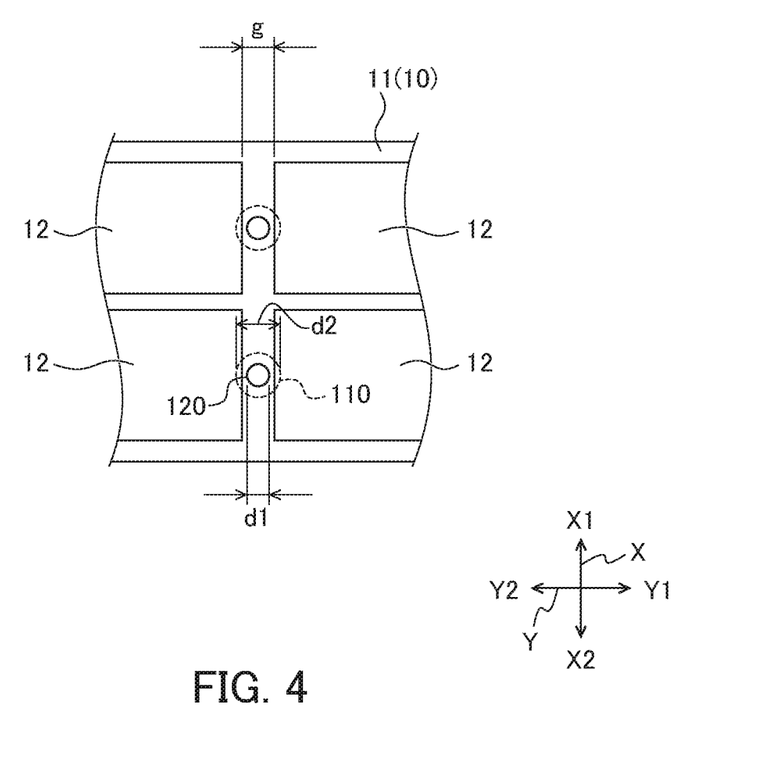
FIG. 4 is a plan view showing the relationship between a first female threaded part 110 and opening 120 with an arrangement of permanent magnets 12.

Next, the first female threaded part 110 provided in the plate 11, diameter of the opening 120 and the interval of the adjacent permanent magnets 12 will be explained. FIG. 4 is a partial plan view showing the relationship between the first female threaded part 110 and opening 120 with the arrangement of permanent magnets 12.

In the present embodiment, the outer circumference of the opening 120 provided in the plate 11 is positioned more to the inside than the outer circumference of the first female threaded part 110 provided in the plate 11. More specifically, the diameter d1 of the opening 120 provided in the plate 11 is set to be smaller than the diameter d2 of the first female threaded part 110 provided in the back surface side (second face F2 side) of the same plate 11, as shown in FIG. 4. For this reason, even in a case of increasing the diameter of the first male threaded part 41 (refer to FIG. 2) of the joining bolt 40, it is possible to rotate the joining bolt 40 by a tool of smaller diameter. In this case, according to the configuration of the present embodiment, it is possible to set the diameter d2 of the first male threaded part 41 to a size that can sufficiently ensure the fixing force of the plate 11, while making it possible to rotate the first male threaded part 41 from outside.

In addition, in the present embodiment, the outer edges of two adjacent permanent magnets 12 sandwiching the opening 120 therebetween are positioned more outwards than the outer circumference of the opening 120 and more inwards than the outer circumference of the first female threaded part 110 provided to the magnet plate 10. More specifically, as shown in FIG. 4, the interval g between the two adjacent permanent magnets 12 sandwiching therebetween the opening 120 (plate 11) is set to be greater than the diameter d1 of the opening 120 and smaller than the diameter d2 of the first female threaded part 110. For this reason, according to the configuration of the present embodiment, it is possible to narrow the interval g between adjacent permanent magnets 12 as much as possible, while enabling to rotate the first male threaded part 41 from outside.

It should be noted that, in place of the joining bolt 40, it has been considered to install the magnet plate 10 to the machine mounting part 30 by inserting a hexagonal holed bolt having a head part of the same diameter as the first male threaded part 41 into a stepped hole provided to the first face F1 side of the plate 11. However, in this case, it is necessary to widen the interval g between adjacent permanent magnets 12 to the same or greater than the diameter of the head of the hexagonal holed bolt. This is because, in order to fit together and rotate the hexagonal wrench (tool) with the hexagonal holed bolt, it is not possible to cover from the end of the head part of the hexagonal holed bolt until the hexagonal hole with the joining layer 13. In contrast, according to the configuration of the present embodiment, since it is possible to set the diameter of the opening 120 to the same diameter as the hexagonal hole 43 of the joining bolt 40 (refer to FIG. 4), it is possible to narrow the interval g between adjacent permanent magnets 12 as much as possible.

Next, a sequence of installing the magnet plate 10 to the machine mounting part 30 will be explained while referencing FIGS. 5A to 5D and FIG. 6. FIGS. 5A to 5D are views showing the sequence of installing the magnet plate 10 to the machine mounting part 30. FIGS. 5A to 5D correspond to cross sections in a plane parallel to the Y-Z plane of the linear motor 1 similar to FIG. 2. FIG. 6 is a partially enlarged view of the joining bolt 40 shown in FIG. 2 and a peripheral portion thereof.

Figure 5A:
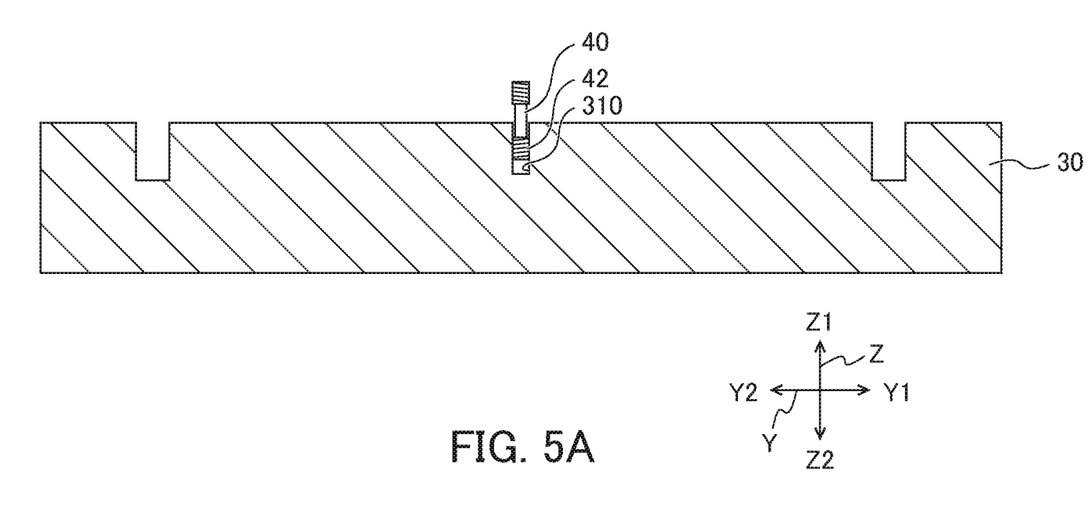
FIG. 5A is a view showing a sequence of installing the magnet plate 10 to the machine mounting part 30.

First, as shown in FIG. 5A, the second male threaded part 42 (head part) of the joining bolt 40 is inserted into the second female threaded part 310 provided in the machine mounting part 30, and the joining bolt 40 is rotated clockwise from the Y1 side by a tool (not illustrated). Then, the second male threaded part 42 of the joining bolt 40 is screwed up to the middle of the second female threaded part 310. This is in order to ensure space for the second male threaded part 42 of the joining bolt 40 to be further tightened to the Z2 side upon tightening the joining bolt 40, as described later.

Figure 5B:
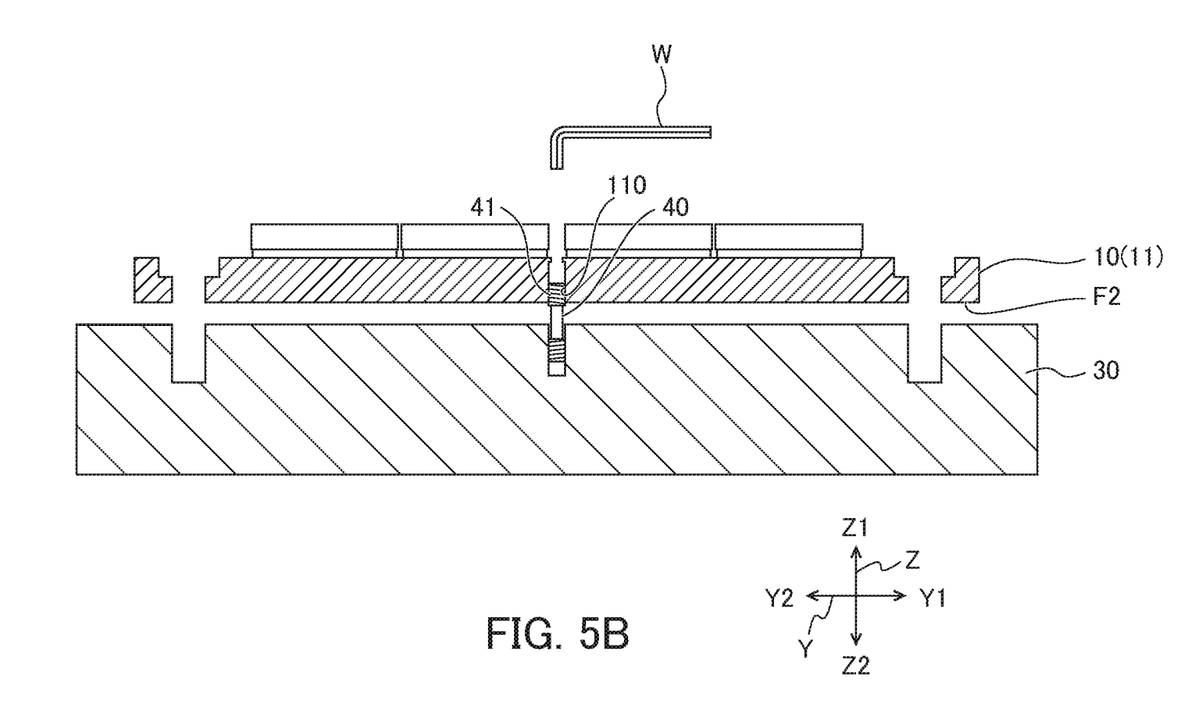
FIG. 5B is a view showing a sequence of installing the magnet plate 10 to the machine mounting part 30.

Furthermore, as shown in FIG. 5B, the second F2 side of the magnet plate 10 (plate 11) is made to cover over the machine mounting part 30, and the first male threaded part 41 of the joining bolt 40 and the first female threaded part 110 of the magnet plate 10 are aligned. Then, the first male threaded part 41 (head part) of the joining bolt 40 is screwed together with the first female threaded part 110 of the magnet plate 10, and the joining bolt 40 is rotated clockwise from the Y1 side by the hexagonal wrench W.

In a state screwing the first male threaded part 41 of the joining bolt 40 together with the first female threaded part 110 of the magnet plate 10 (plate 11), when the joining bolt 40 is rotated clockwise from the Y1 side, the first male threaded part 41 of the joining bolt 40 is fastened to the first face F1 side (Z1 side) of the plate 11, as shown by the arrow a1 in FIG. 6. In addition, in a state screwing the second male threaded part 42 of the joining bolt 40 together with the second female threaded part 310 of the machine mounting part 30, when rotating the joining bolt 40 clockwise from the Y1 side, the second male threaded part 42 of the joining bolt 40 is fastened to the machine mounting part 30 side (Z2 side), as shown by the arrow a2 in FIG. 6.

Figure 5C:
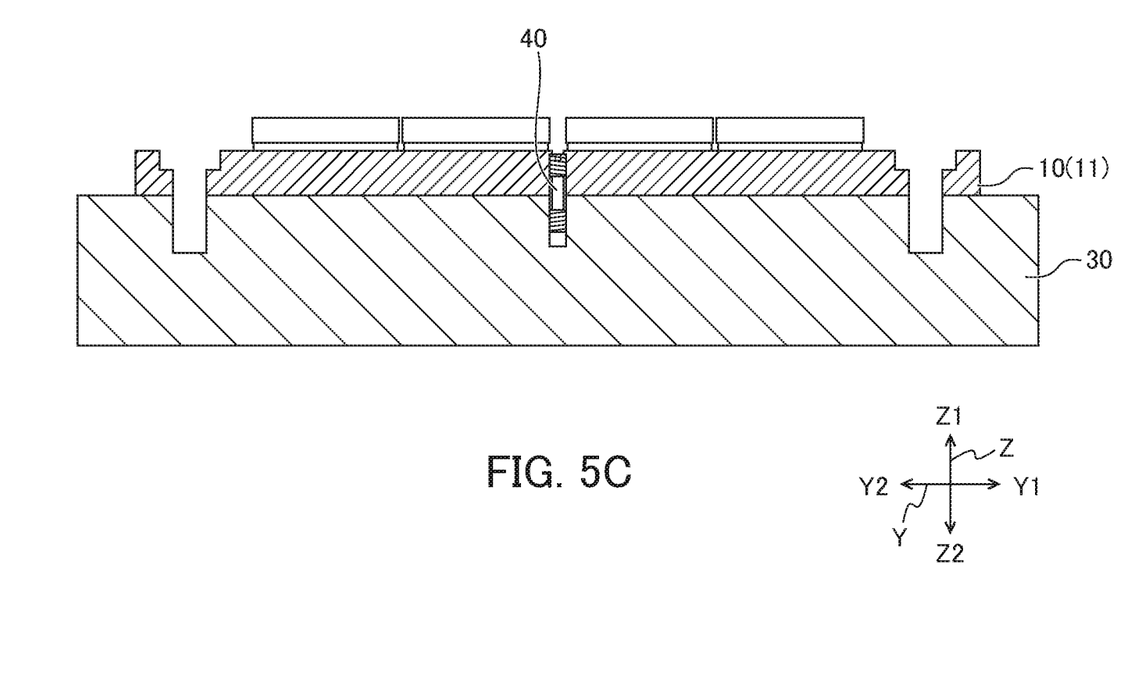
FIG. 5C is a view showing a sequence of installing the magnet plate 10 to the machine mounting part 30.

As mentioned above, when both ends of the joining bolt 40 are fastened to the plate 11 and machine mounting part 30, respectively, tension is generated in the Z1 direction and Z2 direction, respectively, in the joining bolt 40. Then, a force compressing between the plate 11 and machine mounting part 30 (compressive force) is produced as a reaction to this tension between the plate 11 and machine mounting part 30. For this reason, as shown in FIG. 5C, it is possible to install the magnet plate 10 to the machine mounting part 30, by way of the compressive force produced by fastening the joining bolt 40.

Figure 5D:
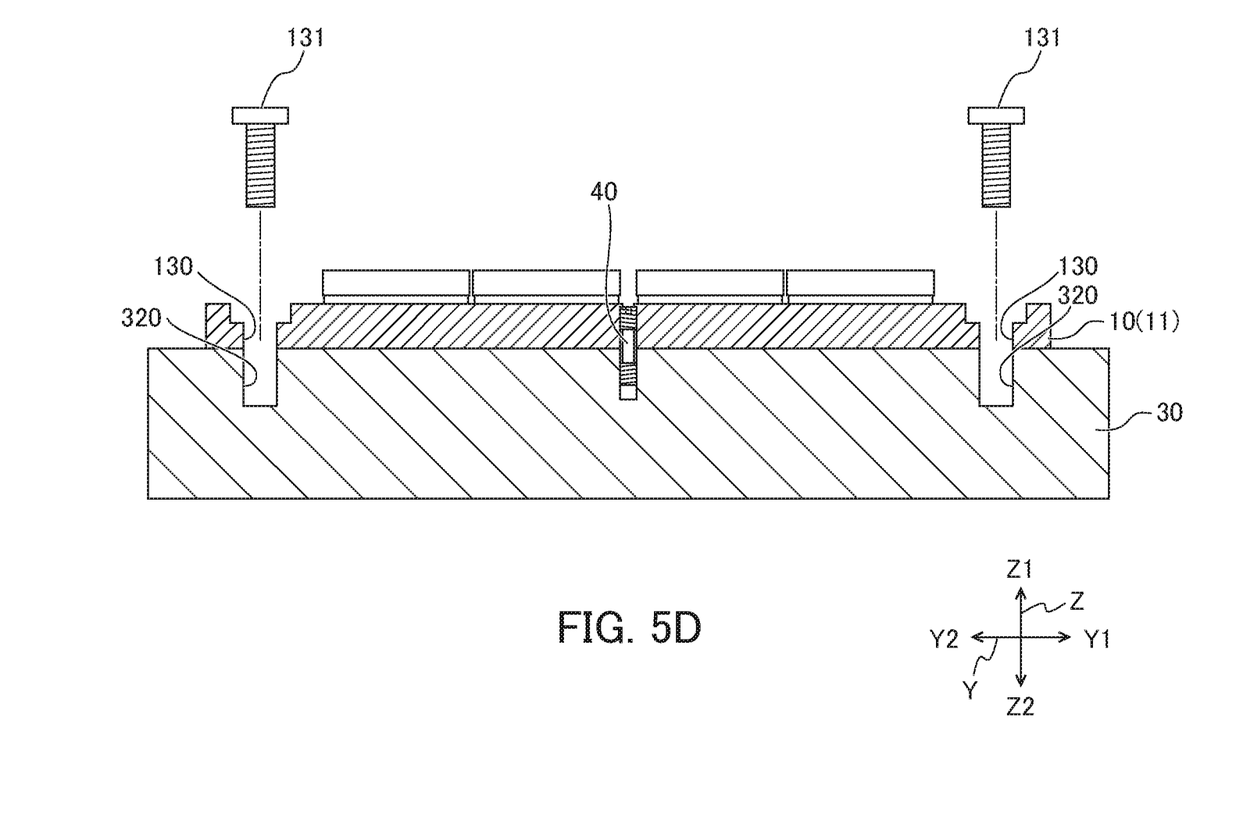
FIG. 5D is a view showing a sequence of installing the magnet plate 10 to the machine mounting part 30.

Then, as shown in FIG. 5D, after installing the magnet plate 10 to the machine mounting part 30, the bolts 131 are inserted into the two stepped holes 130 of the plate 11, respectively, and screwed together with the bolt hole 320 of the machine mounting part 30 to fasten, whereby it is possible to fix the magnet plate 10 to the machine mounting part 30.

According to the aforementioned installation structure of the magnet plate 10 of the present embodiment, by installing the plate 11 to the machine mounting part 30 via the joining bolt 40, it is possible to fix the magnet plate 10 to the machine mounting part 30 in a state suppressing deformation of the plate 11. For this reason, during driving of the linear motor 1, it is possible to suppress the plate 11 from warping to the side of the armature 20, due to the attractive force of the magnetic field produced between the magnet plates 10 and armature 20. Therefore, according to the linear motor 1 of the present embodiment, during driving, it is possible to keep the spacing between the armature 20 and magnet plates 10 at the appropriate interval.

It should be noted that it has been considered to increase the number of bolts fixing the plate 11 to the machine mounting part 30 in order to suppress deformation of the plate 11. However, when providing bolts, since the head part of the bolt is exposed at the surface of the plate 11, the surface area of the permanent magnet 12 decreases in proportion. If the surface area of the permanent magnet 12 decreases, the region not contributing to thrust in the magnet plate 10 will increase, and thus the thrust per unit surface area declines.

In contrast, according to the installation structure of the magnet plate 10 of the present embodiment, due to screwing the joining bolt 40 at the inside of the plate 11, compared to a case of exposing the head part of the bolt at the surface of the plate 11, it is possible to increase the surface area of the permanent magnet 12. For this reason, according to the installation structure of the magnet plate 10 of the present embodiment, it is possible to curb the region not contributing to thrust of the magnet plate 10 to a minimum range.

In addition, it has been considered to suppress deformation of the magnet plate 10 by increasing the thickness of the plate 11 of the magnet plate 10. However, there are problems such as not only the cost rising when increasing the thickness of the plate 11, but also the mass of the magnet plate 10 increasing and the performance of the linear motor declining, and the workability during production worsening. However, according to the installation structure of the magnet plate 10 of the present embodiment, since it is possible to suppress deformation of the magnet plate 10 without increasing the thickness of the plate 11, it is possible to avoid the occurrence of the aforementioned problems.

According to the installation structure of the magnet plate 10 of the present embodiment, the diameter d1 of the opening 120 provided to the plate 11 is similarly set so as to be smaller than the diameter d2 of the first female threaded part 110 provided in the plate 11, as shown in FIG. 4. For this reason, compared to the diameter of the first male threaded part 41, it is possible to rotate the joining bolt 40 with a tool of smaller diameter. Therefore, according to the installation structure of the magnet plate 10 of the present embodiment, it is possible to set the diameter d2 of the first male threaded part 41 to a size that can sufficiently ensure the fixing force of the plate 11, while enabling to rotate the first male threaded part 41 from outside.

According to the installation structure of the magnet plate 10 of the present embodiment, the interval g between two adjacent permanent magnets 12 sandwiching the opening 120 therebetween is set so as to be greater than the diameter d1 of the opening 120 and less than the diameter d2 of the first female threaded part 110, as shown in FIG. 4. For this reason, according to the installation structure of the magnet plate 10 of the present embodiment, it is possible to narrow the interval g between adjacent permanent magnets 12 as much as possible, while enabling to rotate the first male threaded part 41 from outside.

Although embodiments of the present invention have been explained above, the present invention is not to be limited to the aforementioned embodiments, and various modifications and changes are possible as in the modified examples described later, and these are also included within the technical scope of the present invention. In addition, the effects described in the embodiments are merely listing the most preferred effects produced from the present invention, and are not to be limited to those described in the embodiments. It should be noted that the aforementioned embodiments and modified examples described later can be used in combination as appropriate; however, detailed explanations will be omitted.

Modified Embodiments

The present embodiment explains an example of installing one of the plates 11 to the machine mounting part 30 by two joining bolts 40; however, it is not limited thereto. At the central part in the X direction and Y-direction of one plate 11, it may be installed to the machine mounting part 30 by one joining bolt 40. In addition, three or more of the joining bolts 40 may be provided. The present embodiment explains an example of providing the hexagonal hole 43 that fits together with the hexagonal wrench in the head part of the joining bolt 40; however, it is not limited thereto. A hole that fits together with a Torx (registered trademark) wrench, for example, may be provided in the head part of the joining bolt 40.

The present embodiment explains an example establishing the first male threaded part 41 of the joining bolt 40 as left-hand thread, and establishing the second male threaded part 42 as a right-hand thread; however, it is not limited thereto. The first male threaded part 41 of the joining bolt 40 may be established as a right-hand thread, and the second male threaded part 42 may be established as a left-hand thread. In this case, it is possible to installed the plate 11 to the machine mounting part 30 in FIG. 5B by screwing the first male threaded part 41 (head part) of the joining bolt 40 into the first female threaded part 110 of the magnet plate 10, and rotating the joining bolt 40 counter-clockwise from the Y1 side by the hexagonal wrench W, whereby it is possible to installed the plate 11 to the machine mounting part 30 in FIG. 5B.

The present embodiment explains an example establishing the magnet plate 10 as the fixed side, and establishing the armature 20 as the drive side; however, it is not limited thereto. In the linear motor 1, it may establish the magnet plate 10 as the drive side, and establish the armature 20 as the fixed side.

EXPLANATION OF REFERENCE NUMERALS

1: linear motor; 10: magnet plate; 11: plate; 12: permanent magnet; 20: armature; 30: machine mounting part; 40: joining bolt; 41: first male threaded part; 42: second male threaded part; 110: first female threaded part; 120: opening; 310: second female threaded part

What is claimed is:

1. An installation structure of a magnet plate for installing a magnet plate for a linear motor to a machine mounting part via a joining member,
   wherein the magnet plate includes:
      a first face on which a magnet is disposed;
      a second face which opposes the machine mounting part; and
      a first female threaded part provided on an inner side of a hole that passes through the second face and the first face;
      wherein the hole includes an opening in the first face that receives a tool for rotating the joining member that fits together with the first female threaded part,
   wherein the machine mounting part includes, at a side opposing the magnet plate, a second female threaded part of which winding direction of thread grooves is opposite to the first female threaded part,
   wherein the joining member includes:
      a first male threaded part that is formed at one end thereof and can screw together with the first female threaded part; and
      a second male threaded part that is formed at the other end thereof and can screw together with the second female threaded part,
   wherein the magnet plate is installed to the machine mounting part with the first female threaded part being screwed with the first male threaded part of the joining member, and with the second female threaded part of the machine mounting part being screwed with the second male threaded part of the joining member, and
   wherein the opening in the first face is smaller than a diameter of the first male threaded part of the joining member.

2. The installation structure of the magnet plate according to claim 1, wherein an outer circumference of the opening is positioned more inwards than an outer circumference of the first female threaded part of the magnet plate, when viewing the machine mounting part from the magnet plate.

3. The installation structure of the magnet plate according to claim 2, wherein outer edges of the magnets which are adjacent and sandwiching the opening therebetween are positioned more outwards than the outer circumference of the opening and more inwards than an outer circumference of the first female threaded part of the magnet plate, when viewing the machine mounting part from the magnet plate.

4. The installation structure of the magnet plate according to claim 1, wherein, in the joining member, the first male threaded part is a left-hand thread if the second male threaded part is a right-hand thread, and the first male threaded part is a right-hand thread if the second male threaded part is a left-hand thread.

* * * * *